United States Patent [19]

Lamping et al.

[11] Patent Number: 5,638,591
[45] Date of Patent: Jun. 17, 1997

[54] METHOD FOR RESTORING A WHEEL BEADSEAT

[76] Inventors: Bruce Alan Lamping, 5301 Old Springfield, Tipp City, Ohio 45371; William Terry Holzworth, 4311 Autumn Creek, Springfield, Ohio 45505; Lowell Duane Bok, 12861 Amsterdam, Anna, Ohio 45302; James Sidles, 3048 Southern Rd., Richfield, Ohio 43616

[21] Appl. No.: 449,464

[22] Filed: May 24, 1995

[51] Int. Cl.⁶ .................................................. B23P 6/00
[52] U.S. Cl. ........................... 29/402.11; 29/894.351; 301/95
[58] Field of Search ................. 29/894.351; 152/379.4, 152/381.4, 393, 394, 513, 514, DIG. 9, DIG. 16; 301/95

[56] References Cited

U.S. PATENT DOCUMENTS

| | | | |
|---|---|---|---|
| 2,190,611 | 2/1940 | Sembdner | 29/402.09 |
| 2,709,472 | 5/1955 | Hofweber | 152/513 |
| 2,787,312 | 4/1957 | Servaes | 152/513 |
| 3,077,219 | 2/1963 | Solomon | 152/513 |
| 3,504,725 | 4/1970 | Fletcher et al. | 152/DIG. 9 |
| 3,915,214 | 10/1975 | Pile et al. | 152/379 |
| 3,915,215 | 10/1975 | Nebout | 152/379 |
| 4,015,652 | 4/1977 | Harris | 152/513 |
| 4,679,662 | 7/1987 | Nordskog | |
| 4,856,849 | 8/1989 | Fujii et al. | 301/95 |
| 5,018,795 | 5/1991 | Engerand et al. | |
| 5,020,861 | 6/1991 | Gorges | 301/108 |
| 5,145,127 | 9/1992 | Barnes et al. | |
| 5,232,034 | 8/1993 | Gergele | 152/394 |

FOREIGN PATENT DOCUMENTS

| | | | |
|---|---|---|---|
| 066712A2 | 12/1982 | European Pat. Off. | B60B 21/10 |
| 125047A1 | 11/1984 | European Pat. Off. | B60C 3/00 |
| 814403 | 6/1959 | United Kingdom. | |
| 2051696 | 1/1981 | United Kingdom. | |

Primary Examiner—P. W. Echols
Attorney, Agent, or Firm—David M. Ronyak

[57] ABSTRACT

A vehicle wheel of lightweight alloy is provided with a replaceable beadseat protector which protects the beadseat area of the rim of the wheel from tire abrasion and chafing and subsequent corrosion. When formed of organic resin material, the beadseat protector also reduces transfer of heat through the beadseat area of the wheel and the associated tire. The beadseat protector can be removed and replaced periodically as required. The beadseat protector may be constructed form a variety of materials including ferrous and non-ferrous metals and plastics. It is preferably prepared from fiber-reinforced organic resin which is premolded to the desired internal and external contours for the intended application. The wear protector is sealingly affixed to the beadseat area against rotation relative to the wheel rim, by bonding or by mechanical interference.

16 Claims, 1 Drawing Sheet

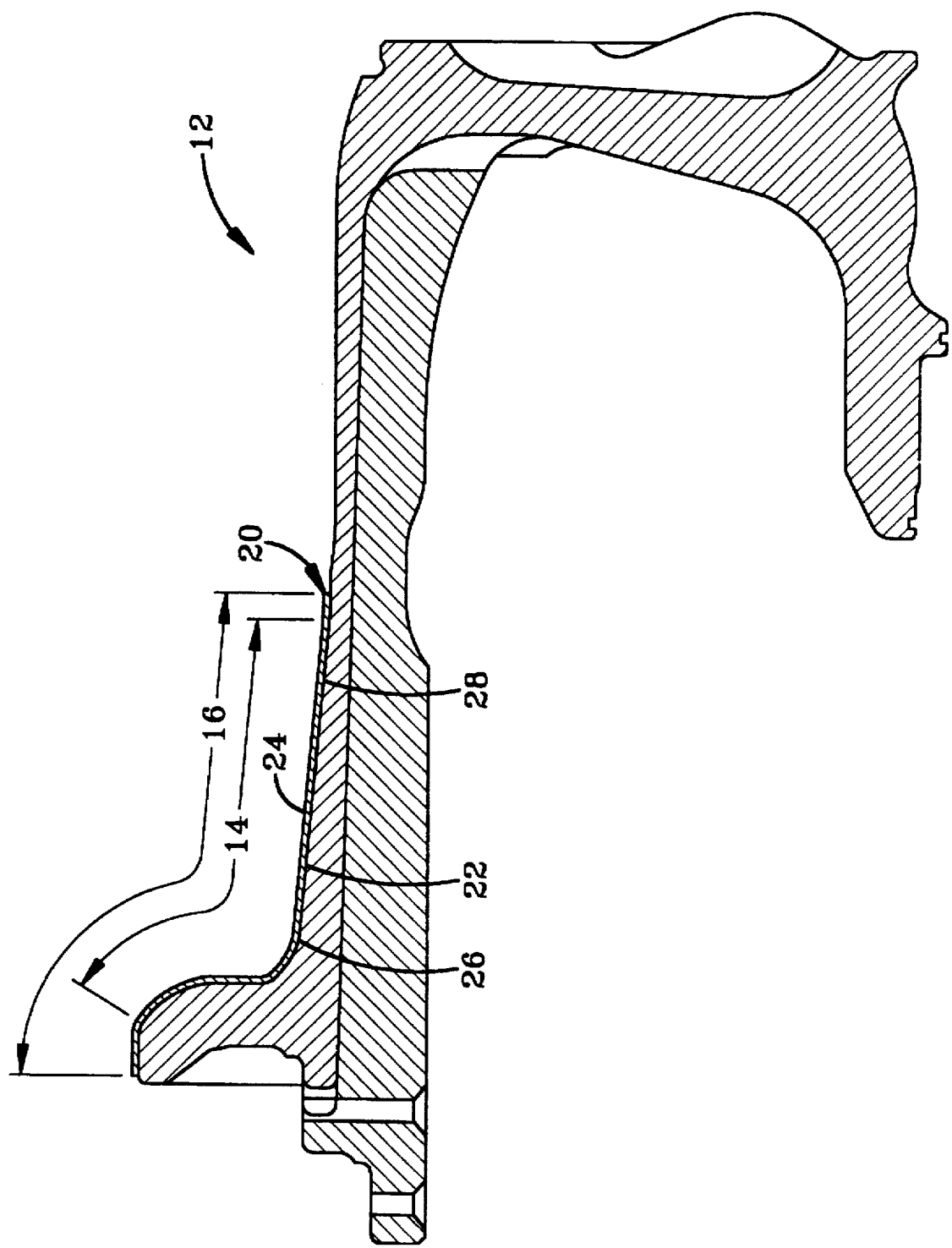

METHOD FOR RESTORING A WHEEL BEADSEAT

BACKGROUND OF THE INVENTION

This invention relates to protection of an area of a lightweight alloy vehicle wheel such as one of aluminum, particularly a replaceable wear protector suitable for use in the bead seat area of the wheel, particularly an aircraft wheel.

Aluminum alloy wheels have come to be widely employed in many aircraft, truck and automobile applications. Currently such wheels are protected by anodizing and/or painting. When placed in service with a tire mounted thereon, a chafing action occurs in the beadseat area. This chafing action wears away the protective anodize and/or paint layer. Once unprotected, this beadseat area is susceptible to attack by elements and debris in the environment, particularly chemical attack resulting in corrosion. The beadseat area is subject to high stresses which accelerates corrosion and increases the risk of fatigue failure initiated at the corrosion pits. Many wheels must be removed prematurely from service due to corrosion pitting in the beadseat area.

Past attempts to rework such corroded areas have included machining away the corroded material, spraying on new metal, and a second machining operation to restore the desired contour. This past repair technique has proven unacceptable due to the possible development of fatigue cracks beneath the newly applied metal which are undetectable upon non-destructive examination of the repaired beadseat surface. These hidden cracks can progress to cause structural failure of the beadseat area even though the surface metal shows no evidence of deterioration. According to another known approach, aluminum alloy aircraft wheel halves have in the past been repaired in local areas including the beadseat area by removal of scratches, nicks, corrosion or other minor surface damage by locally blending the damaged area using fine abrasive cloth, e.g., 320 grit or finer. Damaged packing seat surfaces, e.g., where "O" rings seal valve stems or wheel parts to other parts, have been repaired by blending the damaged area with a hand file, cleaning away any contaminants with solvent, shot peening the reworked area and filling the repair area that has been filed away with an aluminum-filled epoxy such as that available under the trademark Devcon F from Devcon Corp., Danvers, Mass. After the metal-filled epoxy has hardened, the surfaces are again blended and smoothed by hand to restore the original configuration.

The present invention provides a wheel having a replaceable beadseat protector which protects the beadseat area from tire abrasion and chafing and subsequent corrosion. When formed of organic resin material, the wear protector also reduces transfer of heat through the beatseat area of the wheel and the associated tire. The beadseat protector can be removed and replaced periodically as required. Because the beadseat protector is a separate component that is affixed to the beadseat area, the structural integrity and fatigue strength of the base wheel material is unaffected by its presence. The beadseat protector may be constructed form a variety of materials including ferrous and non-ferrous metals and plastics. It is preferably prepared from fiber-reinforced organic resin which is premolded to the desired internal and external contours for the intended application. The wear protector is sealingly affixed to the beadseat area against rotation relative to the wheel rim, by bonding or by mechanical interference.

BRIEF DESCRIPTION OF THE DRAWING

A highly preferred embodiment of the present invention will now be described, by way of example, with reference to the accompanying drawing which is a sectional view of half of a two-part aircraft wheel.

DETAILED DESCRIPTION OF A PREFERRED EMBODIMENT

In the figure there is shown an aircraft wheel half 12 of conventional construction formed of lightweight alloy material, e.g. an aluminum alloy. Aircraft wheel half 12 includes a beadseat area 14 having a predetermined contour set in accordance with industry standards to insure proper mating engagement with the beadseat area of a tire (not shown). Beadseat area 14 has a beadseat protector 20 bonded thereto. Beadseat protector 20 extends beyond the actual beadseat area 14 to be contacted by a tire to encompass an extended area 16 to better protect the rim of wheel half 12.

Beadseat protector 20 is annular in shape and includes a cross-sectional configuration as illustrated in the drawing. Beadseat protector 20 includes a radially inner surface having a first predetermined contour 22 which corresponds to the contour of the underlying wheel half 12 in the area over which the beadseat area 14 extends. The radially outer surface of beadseat protector 20 has a second predetermined contour 24 which is larger than said first predetermined contour and corresponds to the desired beadseat area contour against which a tire is to be supported.

The beadseat protector is preferably formed of fiber-reinforced organic resin matrix. In a preferred embodiment the beadseat protector is prepared by molding a precisely dimensioned annular unit. In a particularly preferred embodiment, the beadseat protector is formed of aramid-reinforced epoxy resin. Alternatively, the beadseat protector may be formed of other reinforcing fibers such as glass and carbon; other organic resin matrices such as phenolics and polyesters. The beadseat protector may be formed from other plastic materials which do not contain reinforcing fibers but are resistant to flow or creep at the maximum beadseat operating temperatures which may be encountered, e.g. at temperatures less than about 400 degrees Fahrenheit for an aircraft wheel and brake assembly. Examples of such materials include PEEK (poly ether ether ketone) available from E.I. dupont de Nemours & Company and PEKK (poly ether ketone ketone) available from ICI America, Inc. The beadseat protector may also be formed of ferrous or non-ferrous metals; use of these materials necessitates removal of the beadseat protector prior to inspection of the underlying area of the wheel in contrast to beadseat protectors formed of organic resin which can be left in position during inspection of the underlying area of the wheel by eddy current technique.

A vehicle wheel of aluminum or other lightweight metal alloy is typically formed by casting or forging and thereafter machining to the desired contour. In accordance with the invention the beadseat area 14 of the wheel 12 is machined away to a further extent to provide an annular rim having an annular beadseat area of a first predetermined contour 22. This first predetermined contour 22 is smaller than that of a second predetermined contour 24 which corresponds to that suitable for supporting contact with the appropriate tire. After machining, a premolded annular beadseat protector 20 having a radially inner contour 22 corresponding to the first predetermined contour of the wheel part 12 and a radially outer contour 24 corresponding to a second predetermined contour is bonded to the rim by an adhesive layer 26 that is chemically compatible with the material of the underlying wheel part 12 and material of which the beadseat protector 20 is formed. Where the beadseat area 14 of the wheel part 12 is formed of aluminum alloy and the beadseat protector 20 is formed of fiber reinforced epoxy resin, the beadseat protector may be bonded to the beadseat area of the rim with an epoxy adhesive.

Where a wheel part 12 including a beadseat area 14 of lightweight metal alloy having a second predetermined contour 24 has become degraded through supporting contact with a tire beadseat in service, the beadseat area 14 and preferably the extended area 16 is machined away a predetermined amount to remove chafed, corroded and pitted material. The amount of material which may be machined away is determined by the requirements of the specific application. In the case of the typical aircraft wheel such as wheel part 12 shown, the amount of material that is permitted to be machined away without degradation of the structural integrity of wheel part 12 is typically about 0.020 inch (0.5 mm). After machining, cleaning and preferably treatment of the underlying metal to inhibit corrosion, e.g. anodizing or a chromate conversion coating, a premolded beadseat protector is bonded into position over the machined beadseat area.

When a wheel experiences degradation of its previously installed beadseat protector 20, it is merely necessary to remove the worn beadseat protector and replace it with a new one. Where the beadseat protector is formed of plastic resin material, whether, or not fiber reinforced, and is bonded to the wheel, it may be removed by shotblasting with an appropriate media, e.g. plastic media. Alternatively, the beadseat protector may be removed by other mechanical means or possibly by chemicals, depending on the composition of the beadseat protector and underlying wheel part 12.

Where the beadseat protector is formed of metal, it may be secured against rotation relative to the wheel by providing mechanical interference, e.g. by sizing the radially inner surface of the beadseat protector slightly less than the size of the radially outer surface of the wheel rim over which the beadseat protector will lie when installed. The beadseat protector is sealed relative to the wheel to prevent loss of tire inflation pressure; this may be accomplished by a gasket 28 or liquid resin sealer.

Preferably the beadseat protector 20 extends beyond the beadseat area 14 to cover and protect extended area 16 to provide maximum protection to wheel part 12 that is otherwise subject to degradation of its protection coating and subsequent corrosion.

It would be apparent that although a specific embodiment of the invention has been described in detail, the invention is not limited to such specifically illustrated and described construction since variations may be made without departing from the principles of the invention.

What is claimed is:

1. A method for restoring the annular beadseat area of an aluminum or other lightweight metal alloy vehicle wheel that has become degraded through use, the method comprising:

a) machining the beadseat area to a first predetermined contour, thereby removing degraded material;

b) providing a precisely dimensioned preformed annular beadseat protector having a radially inner contour corresponding to said first predetermined contour and a larger radially outer second contour corresponding to the desired beadseat contour of the wheel; and c) sealingly affixing the beadseat protector to the beadseat area of the wheel.

2. The method of claim 1 wherein the beadseat protector is formed of fiber-reinforced organic resin and is bonded to the wheel by an organic resin.

3. The method of claim 2 wherein the wheel is an aluminum alloy aircraft wheel and the beadseat protector is molded of fiber-reinforced epoxy.

4. The method of claim 1 wherein the beadseat protector is formed of aramid-reinforced organic resin.

5. The method of claim 1 wherein the beadseat protector is formed of metal and is sealed to the rim by liquid resin sealer.

6. The method of claim 1 wherein the wheel is an aircraft wheel.

7. The method of claim 6 wherein the beadseat protector is bonded to the wheel.

8. The method of claim 6 wherein the protector is molded of aramid-reinforced epoxy resin.

9. The method of claim 8 wherein the beadseat protector extends beyond the beadseat area of the wheel.

10. The method of claim 6 wherein the protector is formed of metal and is bonded by an organic resin to the wheel.

11. The method of claim 6 wherein the protector is formed of metal that is affix against rotation relative to the wheel by mechanical interference with the wheel.

12. The method of claim 11 wherein the protector is sealed relative to the rim by a gasket.

13. The method of claim 6 wherein the wheel includes a premolded precisely dimensioned beadseat protector formed of fiber-reinforced resin that has become degraded through use, the method including removing the beadseat protector to again provide an annular wheel having an annular beadseat area corresponding to said first predetermined contour; providing a new precisely dimensioned preformed annular beadseat protector having a radially inner contour corresponding to said first predetermined contour and a larger radially outer contour corresponding to said second predetermined contour; and bonding said new annular beadseat protector in position on said wheel.

14. The method of claim 6 wherein the beadseat protector extends beyond the beadseat area of the wheel.

15. The method of claim 1 wherein, after further use of the restored wheel, the wheel is again machined in its beadseat area from said second predetermined contour to said first predetermined contour prior to sealingly affixing on said machined area a new preformed precisely dimensioned annular beadseat protector.

16. The method of claim 1 wherein the beadseat protector extends beyond the beadseat area of the wheel.

* * * * *